(12) United States Patent
Kishi

(10) Patent No.: US 7,776,229 B2
(45) Date of Patent: Aug. 17, 2010

(54) GLASS SUBSTRATE PROVIDED WITH TRANSPARENT ELECTRODES AND PROCESS FOR ITS PRODUCTION

(75) Inventor: Masahiro Kishi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/270,874

(22) Filed: Nov. 14, 2008

(65) Prior Publication Data
US 2009/0098351 A1    Apr. 16, 2009

Related U.S. Application Data

(63) Continuation of application No. PCT/JP2007/059781, filed on May 11, 2007.

(30) Foreign Application Priority Data
May 18, 2006    (JP)    ............................. 2006-139046

(51) Int. Cl.
*B44C 1/22*    (2006.01)

(52) U.S. Cl. ........................... 216/85; 216/94; 216/100; 216/101

(58) Field of Classification Search ................... 216/65, 216/94, 97, 100, 101, 85
See application file for complete search history.

(56) References Cited

U.S. PATENT DOCUMENTS 6,184,057 B1 * 2/2001 Van Andel et al. ............ 438/66
6,329,044 B1 * 12/2001 Inoue et al. .................. 428/209
6,818,924 B2 * 11/2004 Kim et al. ...................... 257/79
2002/0030770 A1 * 3/2002 Tsutsui et al. .................. 349/58
2003/0080089 A1 * 5/2003 Song et al. .................... 216/50

FOREIGN PATENT DOCUMENTS

JP    62202418    9/1987

(Continued)

OTHER PUBLICATIONS

Tatsuo Uchida et al., "Flat Panel Display Dictionary", Kogyo Chosakai Publishing Inc., Dec. 25, 2001, pp. 583-585.

(Continued)

*Primary Examiner*—Binh X Tran
(74) *Attorney, Agent, or Firm*—Oblon, Spivak, McClelland, Maier & Neustadt, L.L.P.

(57) ABSTRACT

An object is to provide a process for producing a glass substrate provided with transparent electrodes, whereby in the case of producing a glass substrate provided with transparent electrodes by a laser patterning method, no scratches are formed on the surface of the glass substrate, the resistance value of the formed transparent electrodes is not increased, and the surface roughness is not increased. The means to accomplish the object is to provide a process for producing a glass substrate provided with transparent electrodes, which comprises a pattern forming step of applying laser patterning on a glass substrate provided with a transparent conductive film to obtain a glass substrate provided with a thin film pattern, and an etching step of subjecting the glass substrate provided with a thin film pattern to etching treatment by means of an etching solution which dissolves the glass substrate and which has a characteristic such that its speed to dissolve the glass substrate is higher than its speed to dissolve the transparent conductive film.

13 Claims, 1 Drawing Sheet

FOREIGN PATENT DOCUMENTS

| | | |
|---|---|---|
| JP | 4081110 | 3/1992 |
| JP | 7065727 | 3/1995 |
| JP | 2000114555 | 4/2000 |
| JP | 2000-348610 | 12/2000 |
| JP | 2000-348611 | 12/2000 |
| JP | 2001060432 | 3/2001 |
| JP | 2005108668 | 4/2005 |
| JP | 2005135802 | 5/2005 |
| JP | 2006114428 | 4/2006 |

OTHER PUBLICATIONS

Takeshi Okumura, "Flat Panel Display 2004 Practical Edition", Nikkei Business Publications, Inc., pp. 176-183.

* cited by examiner 12b 14b 13 14a 12a

GLASS SUBSTRATE PROVIDED WITH TRANSPARENT ELECTRODES AND PROCESS FOR ITS PRODUCTION

TECHNICAL FIELD

The present invention relates to a glass substrate provided with transparent electrodes and a process for its production.

BACKGROUND ART

A glass substrate provided with transparent electrodes formed by patterning a transparent conductive film made of e.g. a metal oxide, has been used for computers, home information appliances, various display devices, etc.

And, as a method for producing such a glass substrate provided with transparent electrodes, a photolithography etching process or a liftoff process has been mainly used. In recent years, however, a laser patterning method has been proposed which is excellent in productivity, adaptability to environment, etc. (Patent Documents 1 to 3).

This laser patterning method is a method wherein processing or peeling of a resist layer, a metal thin film layer, etc. formed on a substrate is carried out by means of laser light. There are some types of such a laser patterning method, and among them, a method which comprises irradiating a thin film made of e.g. a metal formed on a substrate directly with laser light via a mask having a desired opening to remove a part of the thin film thereby to form a desired pattern on a substrate, is particularly preferred from the viewpoint of the environmental aspect or the cost such that the process steps can be reduced. Such a method is called a direct patterning method.

However, in such a direct patterning method, if laser light having a high energy density is applied for the purpose of completely removing a part of the transparent conductive film, even if a part of the transparent conductive film can be completely removed, at the same time, a load to the glass substrate increases, and scratches are likely to be formed on its surface. Further, as the energy density increases, tact up tends to be difficult, and the production efficiency tends to be low.

Whereas, if laser light having a low energy density is applied, the portion of the transparent conductive film irradiated with the laser beam can not completely be removed and will remain on the glass substrate, thus leading to so-called film residue. In such a case, an electric current will not properly flow through the transparent electrodes formed on the glass substrate, whereby the glass substrate provided with the formed transparent electrodes tends to hardly provide the desired performance.

For example, in a case where one having transparent electrodes made of a transparent conductive film formed on a glass substrate by a direct patterning method, is employed as a front substrate of a plasma display panel (hereinafter sometimes referred to as PDP), if the energy density of the irradiated laser light is too low, and the portion of the thin film irradiated with the laser light can not completely be removed, and the film residue remains on the glass substrate, it tends to be difficult to discharge a plasma at a proper portion, whereby it tends to be difficult to provide the desired performance as the PDP front substrate.

This point will be described with reference to the drawing.

PDP has a structure comprising a transparent front substrate 1 and a rear substrate 2, for example, as shown in FIG. 2. And, the front substrate 1 has, thereon, display electrodes 5a and 5b made of a transparent conductive film to let pixels generate plasma discharge to form an image, bus electrodes 6 and black stripes 4, and the rear substrate 2 has address electrodes 7. Further, the front substrate 1 has a dielectric layer 8 and a MgO protective layer 9 to secure insulation between the display electrodes 5a and 5b and the address electrodes 7, to generate plasma constantly or to prevent the electrodes from being eroded by plasma. And, in PDP having such a structure, cells (spaces) are defined by barrier ribs 3 formed between the transparent front substrate 1 and the rear substrate 2 facing each other, and in the cells, a penning mixed gas such as He+Xe or Ne+Xe having a high ultraviolet emission efficiency with little visible light emission, is sealed. And, plasma discharge is generated between the display electrodes 5a and 5b to let the phosphor layer 10 on the cell inner wall emit light to form an image on a display screen (Patent Document 4, Non-Patent Documents 1 and 2).

Accordingly, with respect to the display electrodes 5a and 5b formed by applying laser light to a transparent conductive film formed on the transparent front substrate 1, if a film residue remains therebetween on the front substrate 1 (the surface portion of the front substrate exposed by removal of the transparent conductive film by irradiation with laser light), current conduction takes place between the display electrodes 5a and 5b, whereby plasma discharge tends to be hardly generated, and it tends to be difficult to obtain the desired performance as the PDP front substrate.

In a case where the transparent conductive film is removed to a sufficient level for generation of plasma discharge by applying laser light having a high energy density, it is likely that scratches will be formed on the glass substrate surface.

Further, when laser patterning is carried out, it is necessary to scan the laser light or the glass substrate to remove the film. In such a case, due to slight flickering of the laser light or displacement of the glass substrate, the position of the glass substrate to be irradiated is slightly displaced, thus leading to a film residue. Therefore, in order to prevent the film residue, it is necessary to apply laser light to overlap at a part of the position to be irradiated with the laser light (Patent Documents 6 and 7). In the case of carrying out laser patterning by using such a method, a difference in level will result at the portion where the laser light overlaps, and there will be a difference in the discharge characteristic from other portions. As a measure to cope with this problem, it has been proposed to design so that the portion where laser light overlaps is disposed at a portion where the influence to the discharge characteristic is less (Patent Documents 2, 6 and 7). However, by such a method, the designing is restricted, and laser patterning can not be carried out under a condition where the efficiency calculated from the laser output is good.

Thus, in the case of producing a glass substrate provided with transparent electrodes by a direct patterning method, there has been problems irrespective of a high or low energy density of the laser light to be employed, and it has been difficult to obtain the desired performance.

Here, as a measure to deal with this problem, a method is conceivable such that laser light with a low energy density is applied, and the film residue portion is etched by means of an etching solution.

For example, in the production of a solar cell, a method has been proposed such that a thin film is irradiated with laser light, and then, subjected to etching treatment with an etching solution for a thin film to remove the film residue (Patent Document 5).

Patent Document 1: JP-A-2001-60432
Patent Document 2: JP-A-2005-108668
Patent Document 3: JP-A-2005-135802
Patent Document 4: JP-A-7-65727

Patent Document 5: JP-A-2000-114555
Patent Document 6: JP-A-2000-348611
Patent Document 7: JP-A-2000-348610
Non-Patent Document 1: "FLAT PANEL DISPLAY DICTIONARY" edited by Tatsuo Uchida and Hiraki Uchiike, published by Kogyo Chosakai Publishing Inc., Dec. 25, 2001, p. 583-585
Non-Patent Document 2: "FLAT PANEL DISPLAY 2004 PRACTICAL EDITION", edited by Takeshi Okumura, published by Nikkei Business Publications, Inc., p. 176-183

DISCLOSURE OF THE INVENTION

Problems to be Solved by the Invention

However, in the method disclosed in Patent Document 5, the thin film itself is subjected to etching, whereby the resistance value of the thin film increases, and the surface roughness tends to be large. In such a case, if such a treated substrate is used as a PDP front substrate, there is a problem that the discharge tends to be unstable.

Further, as in Patent Document 5, in the case of producing a glass substrate provided with transparent electrodes by a direct patterning method, such a glass substrate is irradiated with laser light having a low energy density, whereby the portion of the transparent conductive film irradiated with the laser light will remain on the glass substrate, but no scratches will be formed on its surface, and the production efficiency can be improved. However, if the film residue portion on this glass substrate is subjected to etching by the above mentioned method, there will be a problem such that the resistance value of the formed transparent electrodes increases, or the surface roughness tends to be high.

It is an object of the present invention to solve such a problem and to provide a process for producing a glass substrate provided with transparent electrodes, whereby in the case of producing a glass substrate provided with transparent electrodes by a direct patterning method, no film residue remains at the portion irradiated with laser light as in a conventional method, or no scratches will be formed on the surface of the glass substrate, and there will be no increase of the resistance value of the formed transparent electrodes or no roughening of the roughness of the surface, and a glass substrate provided with transparent electrodes produced by such a production process.

Means to Solve the Problems

The present inventor has conducted an extensive study to solve the above problems and has found that a process for producing a glass substrate provided with transparent electrodes, which comprises a step of subjecting a glass substrate provided with a thin film pattern formed by irradiation with laser light to etching treatment by means of an etching solution (hereinafter referred to as an etching solution for glass) which dissolves the above glass substrate and which has a characteristic such that its speed to dissolve the glass substrate is higher than the speed to dissolve the above transparent conductive film, is a process for solving the above problems. The present invention has been accomplished on the basis of this discovery.

Namely, the present invention provides the following (1) to (9).

(1) A process for producing a glass substrate provided with transparent electrodes, which comprises a pattern forming step of applying laser patterning on a glass substrate provided with a transparent conductive film to obtain a glass substrate provided with a thin film pattern, and an etching step of subjecting the glass substrate provided with a thin film pattern to etching treatment by means of an etching solution which dissolves the glass substrate and which has a characteristic such that its speed to dissolve the glass substrate is higher than its speed to dissolve the transparent conductive film.

(2) The process for producing a glass substrate provided with transparent electrodes according to the above (1), wherein the etching solution is an etching solution which dissolves the glass substrate at a rate of at least 0.05 nm/min and ITO at a rate of at most 0.002 nm/min.

(3) The process for producing a glass substrate provided with transparent electrodes according to the above (1) or (2), wherein the etching solution contains at least one member selected from the group consisting of NaOH, $Na_2CO_3$ and ammonium fluoride.

(4) The process for producing a glass substrate provided with transparent electrodes according to any one of the above (1) to (3), wherein laser light used in the laser patterning has an energy density of at most 22 $mJ/mm^2$.

(5) The process for producing a glass substrate provided with transparent electrodes according to any one of the above (1) to (4), wherein on the glass substrate, the difference in level at a joint portion where irradiation with laser light overlaps during the laser patterning, is not more than 2 nm.

(6) The process for producing a glass substrate provided with transparent electrodes according to any one of the above (1) to (5), wherein a portion having the transparent conductive film removed, has a transmittance of at least 95% within a wavelength range of from 400 nm to 700 nm.

(7) The process for producing a glass substrate provided with transparent electrodes according to any one of the above (1) to (6), wherein the transparent conductive film contains, as the main component, at least one member selected from the group consisting of ITO, ATO and tin oxide.

(8) A glass substrate provided with transparent electrodes, produced by the process for producing a glass substrate provided with a transparent electrode as defined in any one of the above (1) to (7).

(9) A plasma display front panel employing the glass substrate provided with transparent electrodes as defined in the above (8).

Effects of the Invention

According to the present invention, it is possible to provide a process for producing a glass substrate provided with transparent electrodes, whereby in the case of producing a glass substrate provided with transparent electrodes by a direct patterning method, no film residue will remain at the portion irradiated with laser light as in a conventional method or no scratches will be formed on the surface of the glass substrate, and there will be no increase in the resistance value of the formed transparent electrode as in the case of a conventional method or there will be no increase in the surface roughness.

And, it is possible to lower the energy density of laser light, and the area to be irradiated with laser with the same output can be broadened, whereby it is possible to realize tact up and cost down.

MEANINGS OF SYMBOLS

Figure 1A:
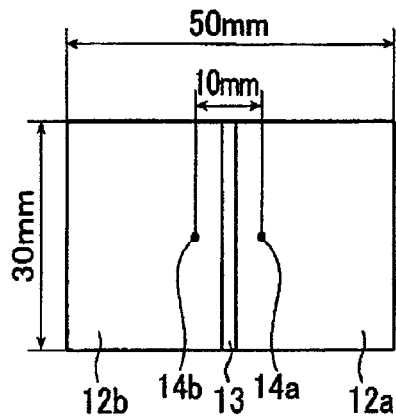
FIG. 1(A) is a schematic view illustrating a film surface on the side provided with a thin film pattern 12, of a glass substrate provided with transparent electrodes in Examples and Comparative Examples.

1: Front substrate
2: Rear substrate
3: Barrier rib
4: Black stripe
5a, 5b: Display electrodes
6: Bus electrode
7: Address electrode
8: Dielectric layer
9: MgO protective layer
10: Phosphor layer
11: Glass substrate
12, 12a, 12b: Thin film pattern
13: Laser patterning portion
14a, 14b: Resistance value-measuring points
20: Glass substrate provided with a thin film pattern

BEST MODE FOR CARRYING OUT THE INVENTION

Now, the present invention will be described in detail.

Now, the process for producing a glass substrate provided with transparent electrodes, which comprises a pattern forming step and an etching step will be described.

Firstly, the pattern forming step will be described.

The pattern forming step in the process of the present invention is a step of applying laser patterning after forming a transparent conductive film on a glass substrate to obtain a glass substrate provided with a thin film pattern.

Here, the glass substrate is not particularly limited, and for example, it is possible to employ various glass substrates (soda lime glass, alkali-free glass, etc.) which have been commonly used as substrates for electrodes. As one of preferred specific embodiments, a high strain point glass for PDP may be mentioned. Further, its size and thickness are also not particularly limited. For example, it is possible to preferably employ one having a size being about 400 to 3,000 mm in length and width. Its thickness is preferably from 0.7 to 3.0 mm, more preferably from 1.5 to 3.0 mm.

Further, the material for the transparent conductive film to be formed on such a glass substrate is also not particularly limited, so long as it is substantially transparent and has electrical conductivity. The material for the transparent conductive film may, for example, be at least one member selected from the group consisting of indium oxide, tin oxide, zinc oxide, ITO (tin oxide-doped indium oxide), ATO (antimony oxide-doped tin oxide), AZO (aluminum oxide-doped zinc oxide), GZO (gallium-doped zinc oxide), titanium oxide and titanium nitride.

Among them, the material for the transparent conductive film is preferably one containing, as the main component, at least one member selected from the group consisting of ITO, ATO, tin oxide and zinc oxide. Here, "the main component" means that the content is at least 50 mass %. The above transparent conductive film preferably contains at least 80 mass %, more preferably at least 95 mass %, further preferably at least 99 mass %, of at least one member selected from the group consisting of ITO, ATO and tin oxide.

Here, the material for the transparent conductive film is preferably one containing indium oxide, tin oxide or zinc oxide in an amount of from 80 to 99 mass %, the rest being a dopant material, further preferably one containing indium oxide in an amount of from 80 to 99 mass %, the rest being a dopant material, further preferably one containing indium oxide in an amount of from 80 to 99 mass %, the rest being tin oxide.

The reason is that the specific resistance is thereby low, and the transmittance of visible light is is high and it has excellent characteristics as a transparent electrode.

Further, the thickness of this transparent conductive film is also not particularly limited. However, if it is too thin, the resistance of the transparent electrode formed by patterning such a transparent conductive film tends to be high, and for example, when such a substrate is used as a PDP front substrate, the plasma discharge tends to be unstable. Accordingly, the thickness is preferably at a level where no such a phenomenon takes place. On the other hand, if it is too thick, the cost for the material increases thus leading to cost up, and at the same time, the transmittance tends to be low, whereby the luminance tends to be low. Accordingly, the thickness of the transparent conductive film is preferably at a level of from 50 to 250 nm.

Further, such a transparent conductive film may be a laminated film constituted by a plurality of films. Further, such a transparent conductive film may be made of one type of material or may be made of different types of materials.

Further, this transparent conductive film preferably has a prescribed upper limit of sheet resistance and specific resistance for every material. For example, in a case where a glass substrate provided with such a transparent conductive film is used as a PDP front substrate, if the specific resistance value is too high, the plasma discharge tends to be unstable. For example, in a case where the material for the transparent conductive film is ITO, its sheet resistance is preferably at most 30Ω, and the specific resistance value is preferably at most $4 \times 10^{-4}$ Ω·cm, and the sheet resistance is more preferably at most 16Ω, and the specific resistance value is more preferably at most $2.1 \times 10^{-4}$ Ω·cm. Further, in a case where it is ATO, the sheet resistance is preferably at most 250Ω, and the specific resistance value is preferably at most $3.3 \times 10^{-4}$ Ω·cm, and the sheet resistance is more preferably at most 200Ω, and the specific resistance value is more preferably at most $2.6 \times 10^{-4}$ Ω·cm.

Further, the method for forming such a transparent conductive film on the above glass substrate is also not particularly limited, and for example, conventional methods may be applied. The conventional methods may, for example, be a physical vapor deposition method (PVD) (such as a vacuum vapor deposition method, an ion plating method or a sputtering method), a chemical vapor deposition method (CVD) (such as a heat CVD method, a plasma CVD method or a photo CVD method), an ion beam vapor deposition method, a baking method (a spraying method) and a liquid phase film-forming method.

Further, the film-forming conditions in such methods are also not particularly limited.

For example, in the case of applying a sputtering method, tin oxide-doped indium oxide is used as a target, an argonoxygen mixed gas is used as an atmosphere gas during the film deposition, the temperature of the glass substrate during the deposition is adjusted to be from 100 to 500° C., and other conditions for the film deposition are adjusted to be within usual ranges, whereby a thin film of a tin oxide-doped indium oxide can be formed on the above gas substrate.

In the process of the present invention, the transparent conductive film is formed on the glass substrate, as mentioned above, but another thin film may be formed between the glass substrate and the transparent conductive film.

For example, in a case where a glass substrate containing an alkali component is used as the glass substrate, the alkali component contained in the glass substrate may diffuse into the transparent conductive film thereby to influence its resistance value. In order to suppress such diffusion, a silicon dioxide film or the like may be formed as an alkali barrier layer between the glass substrate and the transparent conductive film. Such a method for forming another thin film such as an alkali barrier layer is not particularly limited, and for example, a conventional method may be applied. The conventional method may be the same method as the method for forming the above transparent conductive film.

Further, the thickness of such another thin film is also not particularly limited. In the case of the alkali barrier film, the thickness is preferably from 10 to 500 nm from the viewpoint of the alkali barrier property and cost aspect.

In the pattern forming step in the process of the present invention, after forming a transparent conductive film on the glass substrate as described above, laser patterning is applied to obtain a glass substrate provided with a thin film pattern.

Here, the laser patterning is not particularly limited so long as it is a method of forming a desired pattern on the substrate by applying laser light to the above transparent conductive film formed on the glass substrate to remove a part of the thin film. The laser patterning method may, for example, be a direct patterning method wherein the above transparent conductive film formed on the glass substrate is irradiated directly with laser light via a mask having a desired opening to remove a part of such a thin film thereby to form a desired pattern on the substrate.

The type of laser light to be used in the laser patterning is not particularly limited, and the laser light may be suitably selected depending upon e.g. the type of the transparent conductive film, a part of which is to be removed by irradiation with the laser light. It may, for example, be $CO_2$ laser light, YVO laser light, excimer laser light, or Nd-YAG laser light. Among them, it is preferred to employ Nd-YAG laser light, and as the wavelength, it is possible to preferably employ the basic wave (1,064 nm) of Nd-YAG laser, whereby constant laser light can be obtained with a high output at low cost.

The energy density of the laser light to be applied is preferably at most 22 $mJ/mm^2$, more preferably from 18 to 22 $mJ/mm^2$, further preferably from 18 to 20 $mJ/mm^2$. Within such a range, scratches are less likely to be formed by the application of the laser light to the glass substrate, and it is possible to remove the portion to be removed of the above transparent conductive film by etching treatment which will be described hereinafter.

In a case where irradiation with laser light is carried out plural times, the energy density is calculated by taking, as the irradiation time, a value obtained by simply totaling the irradiation time in each irradiation.

In the process of the present invention, by such a pattern forming step, it is possible to obtain a glass substrate provided with a thin film pattern.

Now, the etching step of the present invention will be described.

The etching step in the process of the present invention is a step of subjecting the glass substrate provided with the thin film pattern to etching treatment by means of an etching solution for glass.

By such an etching step, it is possible to remove the residual portion to be removed of the transparent conductive film in the glass substrate provided with the thin film pattern, without increasing the resistance value of the transparent electrodes or without increasing the surface roughness.

As disclosed in Patent Documents 1 to 3, the laser patterning method itself is well known and is a method very much expected as a patterning method which will be substituted for the conventional wet method. The wet method is a method wherein a transparent conductive film is formed on a glass substrate, and the film is subjected to patterning by means of a photolithographic method, and it is still industrially widely used. However, this wet method requires many steps such as exposure, cleaning, etc., and has a problem of waste liquid treatment. Accordingly, an attention is drawn to laser patterning free from such problems.

However, if laser light with a high energy density is applied to avoid a residue of the transparent conductive film (film residue), scratches may form on the glass substrate surface, and on the other hand, if laser light with a low energy density is applied, the film residue may remain, whereby it has been difficult to produce a glass substrate provided with a desired thin film pattern.

Further, in a case where laser patterning is to be conducted, it is necessary to carry it out by scanning laser light (or the glass substrate) in order to remove the film. In such a case, the laser light slightly flickers, and accordingly, the position of the glass substrate to be thereby irradiated tends to be slightly displaced. Accordingly, in order to avoid the film residue, the position irradiated with the laser light is practically required to partially overlap.

In such a case, a difference in level is likely to be formed at the portion where the laser overlaps, and the discharge initiation voltage tends to be non-uniform, thus leading to emission non-uniformity. As a method to overcome such a problem, a method has been proposed wherein the portion where the laser overlaps, is adjusted to be other than the portion of discharge gap between the transparent electrodes of PDP, as disclosed in Non-Patent Documents 2, 6 and 7. However, by such a method, there will be a restriction in designing the disposition of the portion where the laser overlaps.

The present inventor has conducted an extensive study to solve this problem and as a result, have found that although the film residue remains by carrying out patterning in a state where the output of laser light is lowered, such film residue remains in a form such that the transparent conductive film is dissolved in the glass substrate (i.e. in a form where the glass and the film are mixed and integrated). Further, it has been found is that the difference in level formed at the portion where the laser overlaps, is also in the form where the transparent conductive film is dissolved in the glass substrate.

And, it has been found it possible to remove the film residue by removing such a part of the glass substrate having the transparent conductive film dissolved therein by means of an etching solution for glass, and the present invention has been accomplished.

Fundamentally, it is common understanding that for a treating method after laser patterning, since the transparent conductive film is to be patterned, an etching solution to dissolve the transparent conductive film is to be used. Such a method of carrying out etching treatment of a transparent conductive film with an etching solution is the method disclosed in Patent Document 5.

However, although such a method may be suitable as an etching method for a transparent conductive film for a solar cell, it is not suitable, for example, as a treating method after patterning of a transparent conductive film for a PDP front panel. Namely, this method is to dissolve the transparent electrodes themselves, and tends to etch also the surface of the transparent conductive film at a portion to form electrodes which should not be dissolved by patterning, and consequently, an increase of the resistance value of is the transparent electrodes or a change of the surface roughness tends to take place, and when used as a PDP front panel substrate, the driving voltage tends to be high, the power consumption tends to increase, and at the same time, the plasma discharge tends to be unstable. As mentioned above, the transparent conductive film is remaining in the form as dissolved in glass, whereby even if the etching solution for the transparent conductive film is employed, although removal of a part of the film may be possible, it is impossible to completely prevent the film residue. In the case of PDP, individual electrodes are forming pixels on the screen, and to meet the standards, no substantial film residue is permitted. Further, in a case where, for example, in the case of ATO, no proper etching solution is available to dissolve the transparent electrode, this method can not be employed. Thus, by the method disclosed in Patent Document 5, the effects are totally ineffective particularly for PDP.

Whereas, by using an etching solution for glass as in the present invention, etching of the transparent electrode surface can be minimized, such being useful particularly for the PDP front substrate. Further, no film residue remains, and patterning is possible irrespective of the type of the transparent electrodes.

The etching solution for glass to be used in the etching step in the process of the present invention is an etching solution which dissolves the glass substrate and which has a characteristic such that its speed to dissolve the glass substrate is higher than its speed to dissolve the transparent conductive film.

Further, this etching solution is preferably an etching solution which dissolves a glass substrate to be used (such as high strain point glass for PDP) at a rate of at least 0.05 nm/min and the transparent conductive film to be used (such as an ITO thin film) at a rate of at most 0.002 nm/min, by dissolution treatment which will be described below.

Further, this etching solution more preferably dissolves the glass substrate to be used at a rate of at least 0.1 nm/min, further preferably at least 0.15 nm/min. Such an etching solution is preferred from the viewpoint of the productivity, etc.

Further, this etching solution more preferably dissolves the transparent conductive film to be used at a rate of at most 0.0015 nm/min, further preferably at most 0.0010 nm/min.

Such an etching solution is preferred, since the influence (the load) to the above transparent conductive film during the etching treatment is more substantially reduced.

Further, the ratio (the speed to dissolve the glass substrate/ the speed to dissolve the ITO thin film) of the speed of the etching solution for glass to dissolve the glass substrate to be used (the speed to dissolve the glass substrate) to the speed of the etching solution for glass to dissolve the ITO thin film to be used (the speed to dissolve the ITO thin film) is preferably at least 25, more preferably at least 75, further preferably at least 150. Namely, it is possible not only to further reduce the influence (the load) to the transparent conductive film during the etching treatment but also to efficiently prevent the film residue.

Such (1) a speed to dissolve the glass substrate and (2) a speed to dissolve the ITO thin film can be obtained by carrying out the measurement and the treatment to dissolve the glass substrate as described below.

Firstly, the treatment to dissolve the glass substrate in the measurement of (1) a speed to dissolve the glass substrate will be described. Firstly, the glass substrate is cleaned with pure water and then dried. Then, on the surface of this glass substrate, a positive resist (manufactured by FUJIFILM Arch Co., Ltd.) is spin-coated at 500 rpm for 5 seconds and then at 1,000 rpm for 10 seconds, followed by heating at 105° C. for 30 minutes to form a resist film. And, on this resist film, a positive mask having a desired pattern formed, is covered, followed by exposure for two seconds. Then, the exposed substrate is immersed in a 0.5 mass % NaOH aqueous solution for one minute at 20° C. for development to form a resist pattern.

The glass substrate having a resist pattern thus formed on its surface is immersed in an etching solution for 60 minutes.

Then, this glass substrate is taken out from the etching solution, then its surface is entirely exposed and then immersed in a 0.5 mass % NaOH aqueous solution for one minute at 20° C. to remove the resist pattern. Strictly, even in this step of removing the resist pattern, the glass substrate may be slightly dissolved, but the etching amount is at most 0.02 nm and presents no substantial influence to the speed to dissolve the glass substrate.

Then, the measurement of the speed to dissolve the glass substrate will be described.

With respect to the glass substrate thus subjected to the dissolution treatment, the boundary portion between the etched portion without being covered by the resist and the non-etched portion covered with the resist is measured for its shape by means of a shape-measuring apparatus (DEKTAK3-ST, manufactured by Veeco). The eroded amount of the glass substrate at such a boundary portion (the length of erosion in a direction perpendicular to the surface of the glass substrate (the depth from the glass substrate surface)) was measured, and from that value, the speed to dissolve the glass substrate is calculated.

The speed to dissolve the glass substrate is the dissolution speed obtained by carrying out the dissolution treatment as described above, carrying out such measurement, and calculating it from the obtained erosion amount.

Now, the measurement and the treatment to dissolve the glass substrate in the measurement of (2) a speed to dissolve the ITO thin film, will be described.

In the treatment to dissolve the ITO thin film, a glass substrate provided with the ITO thin film, having the ITO thin film formed by the above mentioned method on the surface of a glass substrate, is used.

And, to this glass substrate provided with the ITO thin film, the same dissolution treatment as the above treatment to dissolve the glass substrate is applied, and the corrosion amount is measured by the same measuring method, whereupon the dissolution speed is calculated.

The speed to dissolve the ITO thin film is a dissolution speed obtained by applying the above dissolution treatment by using the above glass substrate provided with the ITO thin film, carrying out such a measurement, and calculating it from the erosion amount thereby obtained.

The etching solution for glass is preferably an etching solution which has a characteristic such that when such dissolution treatment is carried out, it dissolves the glass substrate and the ITO thin film at the rates as mentioned above.

As a preferred etching solution having such a characteristic, a 1 mass % NaOH aqueous solution at 40° C. may be mentioned. The present inventor has measured the speed to dissolve the glass substrate and the speed to dissolve the ITO thin film of this etching solution, whereby they were 0.186 nm/min and at most 0.001 nm/min, respectively.

Further, as an etching solution for glass, a 1 mass % $Na_2CO_3$ aqueous solution at 60° C. may likewise be mentioned, and the speed to dissolve the glass substrate and the speed to dissolve the ITO thin film are 0.577 nm/min and at most 0.001 nm/min, respectively.

Further, as an etching solution for glass, a 0.5 mass % $NH_4F$ aqueous solution at 40° C. may likewise be mentioned, and the speed to dissolve the glass substrate and the speed to dissolve the ITO thin film are 0.206 nm/min and 0.001 nm/min, respectively. Further, aqua regia (100 ml of nitric acid+1,000 ml of pure water+1,000 ml of hydrochloric acid (35% HCl)) at 40° C. has a speed to dissolve the ITO thin film being 45.7 nm/min and a speed to dissolve the glass substrate being less than that level.

Further, an iron chloride-containing acidic aqueous solution (1,000 ml of hydrochloric acid (35% HCl)+1,000 ml of pure water+500 ml of 40% iron(III) chloride) at 40° C. has a speed to dissolve the ITO thin film being 24.4 nm/min and a speed to dissolve the glass substrate being less than that level.

So long as this etching solution has the above mentioned characteristic, its type is not particularly limited. As the type of the etching solution, an inorganic alkali solution or an organic alkali solution may, for example, be mentioned. The inorganic alkali contained in an inorganic alkali solution may, for example, be NaOH, $Na_2CO_3$ or ammonium fluoride. Among them, it is preferably an etching solution containing at least one selected from the group consisting of NaOH, $Na_2CO_3$ and ammonium fluoride, more preferably an etching solution containing NaOH.

The concentration of this etching solution is also not particularly limited, so long as it has the above mentioned characteristic.

Further, the etching treatment method employing such an etching solution is also not particularly limited. With respect to the treating temperature, the treating time, the treating method (such as an immersion method or a spraying method), etc., it may be carried out within usual ranges.

For example, it is one of preferred specific embodiments of etching treatment to immerse the glass substrate provided with the thin film pattern in a 1 mass % NaOH aqueous solution adjusted to from 10 to 90° C., preferably from 10 to 70° C., further preferably from 30 to 50° C. for one minute. The concentration of the NaOH aqueous solution is preferably from 0.2 to 10 mass %, particularly preferably from 0.5 to 5 mass %, further preferably from 1 to 5 mass %.

Further, for example, it is one of preferred specific embodiments for etching treatment to immerse the glass substrate provided with the thin film pattern in a 1 mass % $Na_2CO_3$ aqueous solution adjusted to from 10 to 90° C., preferably from 40 to 80° C., more preferably from 50 to 70° C., further preferably from 55 to 65° C. for one minute. The concentration of the $Na_2CO_3$ aqueous solution is preferably from 0.2 to 10 mass %, particularly preferably from 0.5 to 5 mass %. Further, for example, it is one of preferred specific embodiments of etching treatment to immerse the glass substrate provided with the thin film pattern in a 0.5 mass % ammonium fluoride aqueous solution adjusted to from 10 to 60° C., preferably from 20 to 45° C. for one minute. The concentration of the ammonium fluoride aqueous solution is preferably from 0.2 to 10 mass %, particularly preferably from 0.4 to 2 mass %.

By the etching treatment using such an etching solution for glass, it is possible to completely remove the residual portion to be removed of the transparent conductive film in the glass substrate provided with the thin film pattern without increasing the resistance value of the transparent electrodes and without increasing the surface roughness.

The process of the present invention is a process for producing a glass substrate provided with transparent electrodes, which comprises the pattern forming step and the etching step, as described in the foregoing.

And, according to such a process of the present invention, it is possible to produce a glass substrate provided with transparent electrodes having no scratches by irradiation with laser light and having no film residue without an increase of the resistance value of the transparent electrodes and without an increase of the surface roughness of the transparent electrodes. Accordingly, such a glass substrate can be preferably employed as a PDP front substrate.

Here, "having no scratches by irradiation with laser light" in the present invention means such a state that in a case where PDP is produced by using a glass substrate provided with transparent electrodes produced by the process of the present invention, the discharge can be made constantly, and no trouble on the screen can be visually observed.

Further, here, "no film residue remains" in the present invention means such a state that the insulation resistance value measured across a laser patterning portion by the method described in Examples given hereinafter, is at least 20 MΩ. In such a state, the discharge at the portion across the patterning portion will be good.

Further, here, "without an increase of the resistance value of the transparent electrodes" in the present invention means that the increase in the sheet resistance value measured by the same method as the method which will be described in Examples given hereinafter is 5% or less as between before and after the etching treatment in the process of the present invention.

Further, here, "without an increase of the surface roughness of the transparent electrodes" in the present invention means that the increase in the surface roughness (Ra) measured by the same method as the method which will be described in Examples given hereinafter is 10% or less as between before and after the etching treatment in the process of the present invention.

By applying such a process of the present invention, it is possible to produce, for example, a PDP front substrate.

For example, after producing the glass substrate provided with transparent electrodes by the process of the present invention, bus electrodes are formed by applying e.g. a conventional photolithography etching process or liftoff process, then a material for a dielectric is applied on the upper surface, followed by firing to form a dielectric layer thereby to produce a PDP front substrate.

Here, it is possible to carry out an etching step after forming the bus electrodes.

Further, the etching step in the process of the present invention may also serve as cleaning treatment.

For example, in the process for producing a PDP front substrate shown here, it is possible to carry out the etching step by using the above etching solution which also has a performance to clean the surface of the glass substrate provided with a thin film pattern.

EXAMPLES

Now, Examples and Comparative Examples of the present invention will be described.

Example 1

Pattern Forming Step

As a glass substrate, a substrate of high strain point glass for PDP (PD200, manufactured by Asahi Glass Company, Limited) of 1,000 mm×650 mm was prepared. And, on the surface of this glass substrate, deposition of ITO was carried out so that the film thickness would be 130 nm, by a DC magnetron sputtering method. As the target, an indium oxide target having 10 mass % of tin oxide doped, was used. The temperature of the glass substrate during the deposition was 250° C., and the sputtering gas was an Ar—$O_2$ mixed gas. The composition of the formed film was the same as the target. The glass substrate having an ITO thin film (transparent conductive film) on its surface thus obtained will hereinafter be referred to as the glass substrate provided with the ITO is thin film.

Then, the glass substrate provided with the ITO thin film was cut into plural sheets of 50 mm×30 mm. And, laser patterning is applied to each sheet to obtain a glass substrate 20 provided with a thin film pattern as shown in FIG. 1.

Figure 1B:
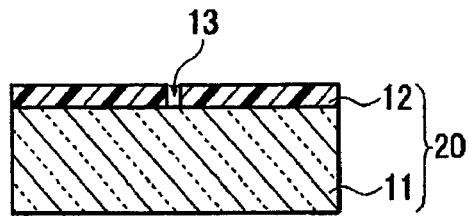
FIG. 1(B) is a side view thereof.
Figure 2:
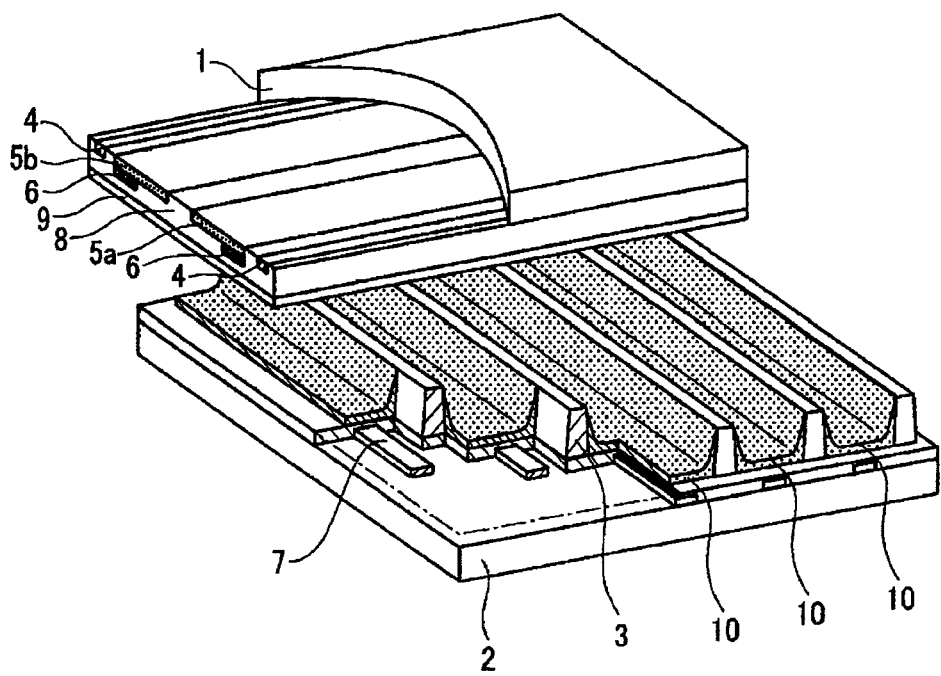
FIG. 2 is a schematic view illustrating a general construction of conventional PDP.

FIG. 1 shows a view wherein laser patterning is carried out at the center portion of the long side of the ITO thin film of the glass substrate provided with the ITO thin film, with a width of 100 μm substantially in parallel with the short side to form a laser patterning portion 13, thereby to form a thin film pattern 12 (12a, 12b) on the glass substrate 11. FIG. 1(A) is a view showing the film surface on the side provided with the thin film pattern 12 of the glass substrate 20 provided with the thin film pattern, and FIG. 1(B) is a view showing the cross section of the glass substrate 20 provided with the thin film pattern.

The laser is formed in a rectangular shape in cross section by e.g. a homogenizer and applied to the substrate.

Here, the laser patterning conditions were such that the laser light wavelength was 1,064 nm, the laser width was 100 μm, the laser length was 100 μm, the laser pulse width was 120 ns, the laser irradiation frequency was 10 KHz, and overlapping during the laser irradiation was 10 μm. Irradiation with laser was once at one portion.

Further, with respect to the energy density during the laser patterning, the energy density per irradiation with the laser was changed in seven steps within a range of from 15.0 mmJ/mm² to 36.3 mmJ/mm², and laser patterning was carried out at each energy density to obtain a glass substrate 20 provided with a thin film pattern.

Etching Step

Then, the glass substrate provided with the thin film pattern subjected to laser patterning at each energy density was immersed in a 3 mass % NaOH (sodium hydroxide) solution at 50° C. for two minutes. The substrate obtained by carrying out such etching treatment will hereinafter be referred to as a glass substrate provided with transparent electrodes.

Then, the obtained glass substrate provided with transparent electrodes was evaluated as follows. The results are shown in Table 1.

(1) Laser Energy Density for Insulation Between the Transparent Electrodes

Firstly, with respect to each glass substrate provided with transparent electrodes, as shown in FIG. 1, the insulation resistance value between the measuring points across the laser patterning portion 13 was measured. Here, the measurement of the insulation resistance value was carried out by measuring the insulation resistance value between the measuring points by connecting a tester (PC510, manufactured by Sanwa Electric Instrument Co., Ltd.) to the measuring points 14a and 14b for the resistance value of the transparent electrodes with a distance of 10 mm (bilateral symmetry).

As mentioned above, FIG. 1 is a view showing a glass substrate 20 provided with a thin film pattern and is not a view showing a glass substrate provided with transparent electrodes. However, the structure is generally the same (specifically, one having the thin film pattern 12 of the glass substrate 20 provided with the thin film pattern converted to transparent electrodes, is a glass substrate provided with transparent electrodes), and therefore FIG. 1 was employed for the description.

Then, with respect to the insulation resistance value of each glass substrate provided with transparent electrodes, the minimum energy density at which the insulation resistance value becomes at least 20 MΩ, was obtained. Such a value is shown in Table 1. As this value is smaller, it becomes possible to form a pattern having a sufficient insulation property by laser light with a small energy density.

In order for PDP to function properly, a sufficiently strong insulating property is required at the laser patterning portion 13 in FIG. 1, and the insulation resistance value of the laser patterning portion 13 is required to be at least 20 MΩ.

In the following (2) to (6), evaluation was carried out only with respect to a glass substrate provided with transparent electrodes obtained by irradiation with laser light with the minimum energy density at which the insulation resistance value would be at least 20 MΩ.

(2) Film Reduction Amount

The thickness of transparent electrodes of a glass substrate provided with the transparent electrodes was measured before and after etching treatment, and the reduction amount of the thin film was calculated. Here, the thickness of the thin film was measured by a shape-measuring apparatus (DEK-TAK3-ST, manufactured by Veeco). The film reduction amount is preferably at most 0.1 nm, particularly preferably at most 0.05 nm.

(3) Surface Roughness

The surface roughness is the arithmetic average height Ra stipulated in JIS B0601 (2001), and it was obtained by measuring an optional measuring region (5 μm×5 μm) of transparent electrodes of a glass substrate provided with the transparent electrodes by an atomic force microscope (Nano Scope IIIa; Scan Rate 1.0 Hz, Sample Lines 256, Off-line Modify Flatten order-2, Planefit order-2, manufactured by Digital Instruments).

This surface roughness Ra is preferably at most 2.5 nm. In a case where a glass substrate provided with transparent electrodes is used, for example, as a PDP front substrate, if this surface roughness Ra is too high, erosion of the dielectric tends to increase, the driving voltage tends to be high, the power consumption tends to increase, and the plasma discharge tends to be unstable.

(4) Sheet Resistance Value

An optional point of transparent electrodes of a glass substrate provided with the transparent electrodes was measured by a surface resistance meter (LORESTA IP MCP-250, manufactured by Mitsubishi Petrochemical Co., Ltd.).

In the case of ITO, this sheet resistance value is preferably at most 30Ω, more preferably at most 16Ω. In a case where the glass substrate provided with the transparent electrodes is used, for example, as a PDP front substrate, if this sheet resistance is too high, the driving voltage tends to be high, the power consumption tends to increase, and the plasma discharge tends to be unstable.

(5) Transmittance of Light with a Wavelength of 550 nm at the Laser Etching Portion The transmittance at the portion subjected to laser etching was measured by means of a microscopic spectrophotometer (MCPD-1000, manufactured by Otsuka Electronics Co., Ltd.). The diameter for measuring the transmittance was about 40 μm, and the transmittance through a glass substrate provided with an ITO film was measured on such a basis that the intensity of light transmitted through a substrate of high strain point glass for PDP (PD200, manufactured by Asahi Glass Company, Limited) having no ITO deposited, was regarded as 100%. The transmittance measurement was carried out within a wavelength region of from 400 nm to 700 nm, and as a typical point, the transmittance with a wavelength of 550 nm was shown in Table 1.

(6) Measurement of the Difference in Level at a Joint Portion

In a case where laser patterning is to be carried out, it is necessary to carry out the laser patterning by scanning laser light (or the glass substrate) in order to remove the film. In such a case, the laser light slightly flickers, and accordingly, the position of the glass substrate to be irradiated with such laser light is slightly displaced. Accordingly, in order to prevent the film residue, the position irradiated with laser light is practically required to partially overlap. Such an overlapped portion was measured for its shape by means of a shape-measuring apparatus (DEKTAK3-ST, manufactured by Veeco), and the difference in level was measured.

In a case where a glass substrate provided with transparent electrodes is used, for example, as a PDP front substrate, when the difference in level is not more than 2 nm, the change in impedance will not be problematic, and such a difference in level will not be influential over the discharge characteristic.

Example 2

A glass substrate provided with transparent electrodes was obtained in the same manner as in Example 1 except for such a change that the glass substrate provided with the thin film pattern was immersed in a 3 mass % $Na_2CO_3$ (sodium carbonate) solution at 60° C. for 3 minutes. And, evaluation was carried out in the same manner as in Example 1. The results are shown in Table 1.

Example 3

A glass substrate provided with transparent electrodes was obtained in the same manner as in Example 1 except for such a change that the glass substrate provided with the thin film pattern was immersed in a 0.5 mass % $NH_4F$ (ammonium fluoride) solution at 40° C. for two minutes. And evaluation was carried out in the same manner as in Example 1. The results are shown in Table 1.

Comparative Example 1

To the glass substrate provided with the thin film pattern obtained in Example 1, no etching treatment was applied, and evaluation was carried out in the same manner as in Example 1. The results are shown in Table 1.

As shown in this Table, the insulation resistance value became O.L. (over load, the same applies hereinafter) (at least 20 MΩ) when the energy density was at least 36.3 mmJ/mm². This value generally agrees to an observation such that "in the case of a transparent electrode made of an ITO film, an energy density of at least 30 mJ/mm² is required to attain a resistance value of at least 10 MΩ".

Comparative Example 2

A glass substrate provided with transparent electrodes was obtained in the same manner as in Example 1 except for such a change that the glass substrate provided with the thin film pattern was immersed in pure water at 40° C. for one minute. And, evaluation was carried out in the same manner as in Example 1. The results are shown in Table 1. Without any change from Comparative Example 1, the insulation resistance value was also O.L. (at least 20 MΩ) at the energy density of at least 36.3 mmJ/mm².

Comparative Example 3

A glass substrate provided with transparent electrodes was obtained in the same manner as in Example 1 except for such a change that the glass substrate provided with the thin film pattern was immersed in aqua regia (a mixed liquid of 100 ml of nitric acid+1,000 ml of pure water+1,000 ml of hydrochloric acid (35% HCl) (hereinafter referred to as "the aqua regia etching solution")) at 40° C. for 15 seconds. And, evaluation was carried out in the same manner as in Example 1. The results are shown in Table 1.

Comparative Example 4

A glass substrate provided with transparent electrodes was obtained in the same manner as in Example 1 except for such a change that the glass substrate provided with the thin film pattern was immersed in an iron chloride-containing acidic aqueous solution (mixed liquid of 1,000 ml of hydrochloric acid (35% HCl)+1,000 ml of pure water+500 ml of 40% iron(III) chloride (hereinafter referred to as "the iron chloride etching solution") at 40° C. for 15 seconds. And, evaluation was carried out in the same manner as in Example 1. The results are shown in Table 1.

Examples 1 to 3 are examples wherein a transparent electrode made of an ITO film was treated with an etching solution for glass. The insulation resistance value was O.L. (at least 20 MΩ) with at least 18.0 mmJ/mm², and thus, a sufficiently strong insulating property required for PDP to properly function was obtained with an energy density substantially low as compared with Comparative Example 1. Further, even by the etching treatment, the film thickness, the resistance (sheet resistance) and the surface roughness (Ra) of the transparent electrode made of the ITO film underwent no change and maintained good values. Further, no scratches were observed on the glass substrate. Further, the transmittance of the laser etching portion was good at a level of at least 95%, and the difference in level at the joint portion was also not more than 2, thus presenting an excellent characteristic, for example, as a PDP transparent electrode.

On the other hand, in Comparative Examples 1 and 2, no particular treatment was applied, whereby a very high laser output was required for the patterning, and scratches were observed on the glass substrate, such being undesirable.

The transmittance of the laser etching portion was very low at a level of from 76 to 77%, and the difference in level of the joint portion was also at least 10 nm, whereby a constant discharge characteristic was hardly obtainable, such being not suitable, for example, as a PDP transparent electrode.

Further, Comparative Examples 3 and 4 are comparative examples wherein treatment was carried out by an etching solution for etching an ITO film. Like in Examples 1 to 3, the insulation resistance value was O.L. (at least 20 MΩ) with 18.0 mmJ/mm². However, the transparent electrode made of the ITO film was etched, whereby the sheet resistance increased, and the surface roughness also increased, such being an improper treating method since, as a PDP transparent electrode, the driving power increases and the discharge tends to be unstable.

TABLE 1

| | Laser energy density for insulation between electrodes (mJ/mm²) | Transparent electrode | | | Transmittance of light with wavelength of 550 nm through the etching portion (%) | Difference in level at the joint portion (nm) |
| --- | --- | --- | --- | --- | --- | --- |
| | | Film reduction amount (nm) | Surface roughness (nm) | Sheet resistance (Ω) | | |
| Ex. 1 | 18.0 | 0.0 | 2.2 | 15.54 | 97 | 1 or less |
| Ex. 2 | 18.0 | 0.0 | 2.1 | 15.45 | 98 | 1.5 |
| Ex. 3 | 18.0 | 0.0 | 2 | 15.45 | 98 | 1 or less |
| Comp. Ex. 1 | 36.3 | 0.0 | 2.2 | 15.49 | 76 | 12 |
| Comp. Ex. 2 | 36.3 | 0.0 | 2.2 | 15.52 | 77 | 13 |
| Comp. Ex. 3 | 18.0 | 7.2 | 2.8 | 17.5 | 97 | 1 or less |
| Comp. Ex. 4 | 18.0 | 4.0 | 3.4 | 16.7 | 97 | 1 or less |

Now, Examples and Comparative Examples will be described wherein instead of ITO used in Examples 1 to 3 and Comparative Examples 1 to 4, ATO (antimony oxide-doped tin oxide) was used.

Example 4

The same glass substrate as used in Example 1 was prepared. And, on this glass substrate, deposition of ATO was carried out by a DC magnetron sputtering method so that the film thickness would be 130 nm. As the target, a tin oxide target doped with 3 mass % of antimony oxide as a whole, was used. The temperature of the sample substrate during the deposition was 200° C., and as the sputtering gas, an Ar—O₂ mixed gas was used. The composition of the formed film was equal to the target.

And, thereafter, a pattern forming step and an etching step were applied in the same manner as in Example 1, and evaluation was carried out in the same manner as in Example 1. The results are shown in Table 2. Here, in the case of ATO, the sheet resistance value is preferably at most 250Ω, more preferably at most 200 Ω.

Example 5

A glass substrate provided with transparent electrodes was obtained in the same manner as in Example 4 except for such a change that the glass substrate provided with the thin film pattern was immersed in 3 mass % Na₂CO₃ (sodium carbonate) solution at 60° C. for 3 minutes. And, evaluation was carried out in the same manner as in Example 4. The results are shown in Table 2.

Example 6

A glass substrate provided with transparent electrodes was obtained in the same manner as in Example 4 except for such a change that the glass substrate provided with the thin film pattern was immersed in a 0.5 mass % NH₄F (ammonium fluoride) solution at 40° C. for two minutes. And, evaluation was carried out in the same manner as in Example 4. The results are shown in Table 2.

Comparative Example 5

To the glass substrate provided with the thin film pattern obtained in Example 4, no etching treatment was carried out, and evaluation was carried out in the same manner as in Example 4. The results are shown in Table 2. As shown in this Table, the insulation resistance value was O.L. (at least 20 MΩ) with at least 24.8 mmJ/mm².

Comparative Example 6

A glass substrate provided with transparent electrodes was obtained in the same manner as in Example 4 except for such a change that the glass substrate provided with the thin film pattern was immersed in pure water at 40° C. for one minute. And, evaluation was carried out in the same manner as in Example 4. The results are shown in Table 2.

Comparative Example 7

A glass substrate provided with transparent electrodes was obtained in the same manner as in Example 4 except for such a change that the glass substrate provided with the thin film pattern was immersed in the aqua regia etching solution for 15 seconds. And evaluation was carried out in the same manner as in Example 4. The results are shown in Table 2.

Comparative Example 8

A glass substrate provided with transparent electrodes was obtained in the same manner as in Example 4 except for such a change that the glass substrate provided with the thin film pattern was immersed in an is iron chloride etching solution for 15 seconds. And, evaluation was carried out in the same manner as in Example 4. The results are shown in Table 2.

Examples 4 to 6 are examples wherein treatment was carried out by an etching solution for etching glass. No substantial change was observed in the characteristics of the ATO film such as the film reduction and the surface roughness, and with an energy density of laser light being at least 18.0 mmJ/mm², the insulation resistance value became O.L. (at least 20 MΩ), thus providing a sufficiently high insulating property required for PDP to function properly at a very low energy density, and no scratches were also observed on the glass substrate. Further, the transmittance at the laser etching portion was good at a level of at least 95%, and the difference in level at the joint portion was also not more than 2, thus providing an excellent characteristic, for example, as a PDP transparent electrode.

On the other hand, in Comparative Examples 5 and 6, no particular treatment was applied, whereby a very high laser output was required for the patterning, and scratches were observed on the glass substrate, such being undesirable. The transmittance at the laser etching portion was very low at a level of at most 70%, and the difference in level at the joint portion was large, whereby a constant discharge characteristic is hardly obtainable, such being not suitable, for example, as a PDP transparent electrode.

Further, Comparative Examples 7 and 8 are comparative examples wherein treatment was carried out by using an etching solution for etching ITO. Such etching solutions are incapable of etching glass or ATO, whereby there was no difference from Comparative Example 5 (Example wherein no etching treatment was carried out), and the energy density where the insulation resistance value became O.L. (at least 20 MΩ) was high, and scratches were observed on the glass substrate, such being undesirable.

In the case of a transparent conductive film which is chemically stable and has no proper etching solution to dissolve it, like ATO, it has been impossible to improve the insulation property by etching directly the transparent conductive film after the laser patterning as in Comparative Example 3 or 4 employing ITO.

However, even in a case where there is no proper etching solution for etching such a transparent conductive film, it is possible to obtain a sufficiently high insulating property required for PDP to function properly at a low energy density in the patterning step by laser patterning of the present invention, by the treatment with an etching solution for glass as in Examples 4 to 6.

INDUSTRIAL APPLICABILITY

The glass substrate provided with transparent electrodes of the present invention is free from a film residue at a portion irradiated with laser light or scratches on the surface of the glass substrate, and free from an increase in the resistance value of the transparent electrodes or an increase in the surface roughness, and thus it is suitable as a PDP front substrate.

The entire disclosure of Japanese Patent Application No. 2006-139046 filed on May 18, 2006 including specification, claims, drawings and summary is incorporated herein by reference in its entirety.

What is claimed is:

1. A process for producing a glass substrate provided with transparent electrodes, which comprises
   applying laser patterning on a glass substrate provided with a transparent conductive film to obtain a glass substrate provided with a thin film pattern, and
   subjecting the glass substrate provided with a thin film pattern to etching treatment by means of an etching solution to produce the transparent electrodes on the glass substrate, wherein
   an etch rate of the glass substrate in the etching solution is higher than an etch rate of the transparent conductive film in the etching solution; and
   the etching solution is an etching solution which dissolves the glass substrate at a rate of at least 0.05 nm/min and the transparent conductive film at a rate of at most 0.002 nm/min.

2. The process according to claim 1, wherein the etching solution contains at least one member selected from the group consisting of NaOH, Na$_2$CO$_3$ and ammonium fluoride.

3. The process according to claim 1, wherein laser light used in the laser patterning has an energy density of at most 22 mJ/mm².

4. The process according to claim 1, wherein a portion having the transparent conductive film removed has a transmittance of at least 95% within a wavelength range of from 400 nm to 700 nm.

5. The process according to claim 1, wherein the glass substrate comprises a glass selected from the group consisting of an soda lime glass, a glass containing an alkali component, and an alkali-free glass.

TABLE 2

| | Laser energy density for insulation between electrodes (mJ/mm²) | Transparent electrode | | | Transmittance of light with wavelength of 550 nm through the etching portion (%) | Difference in level at the joint portion (nm) |
| --- | --- | --- | --- | --- | --- | --- |
| | | Film reduction amount (nm) | Surface roughness (nm) | Sheet resistance (Ω) | | |
| Ex. 4 | 18.0 | 0.0 | 0.82 | 195 | 95 | 1 or less |
| Ex. 5 | 18.0 | 0.0 | 0.86 | 198 | 94 | 1.5 |
| Ex. 6 | 18.0 | 0.0 | 0.88 | 197 | 95 | 1 or less |
| Comp. Ex. 5 | 24.8 | 0.0 | 0.85 | 195 | 68 | 11 |
| Comp. Ex. 6 | 24.8 | 0.0 | 0.87 | 197 | 69 | 12 |
| Comp. Ex. 7 | 24.8 | 0.0 | 0.84 | 194 | 70 | 11 |
| Comp. Ex. 8 | 24.8 | 0.0 | 0.89 | 196 | 68 | 13 |

6. The process according to claim 1, wherein between the glass substrate and the transparent conductive film is another film.

7. The process according to claim 6, wherein
the glass substrate comprises a glass containing an alkali component; and
the other film between the glass substrate and the transparent conductive film comprises silicon dioxide.

8. The process according to claim 1, wherein the transparent conductive film contains, as the main component, at least one member selected from the group consisting of ITO, ATO and tin oxide.

9. The process according to claim 8, wherein the transparent conductive film contains at least 80 mass % of the at least one member selected from the group consisting of ITO, ATO and tin oxide.

10. The process according to claim 8, wherein
the transparent conductive film comprises ITO;
the ITO has a sheet resistance of at most 30$\Omega$; and
the ITO has a specific resistance value of at most $4\times10^{-4}$ $\Omega\cdot$cm.

11. The process according to claim 8, wherein
the transparent conductive film comprises ATO;
the ATO has a sheet resistance of at most 250$\Omega$; and
the ATO has a specific resistance value is preferably at most $3.3\times10^{-4}$ $\Omega\cdot$cm.

12. The process according to claim 8, wherein the transparent conductive film comprises tin oxide.

13. The process according to claim 8, wherein the transparent conductive film contains the ITO.

* * * * *